United States Patent [19]

Wilcox

[11] 3,867,452

[45] Feb. 18, 1975

[54] 2-NITROPHENYLHYDRAZINES

[76] Inventor: Merrill Wilcox, 2911 N.W. 30th Ter., Gainesville, Fla. 32601

[22] Filed: Aug. 21, 1972

[21] Appl. No.: 282,637

Related U.S. Application Data

[63] Continuation-in-part of Ser. No. 102,993, Dec. 30, 1970, abandoned.

[52] U.S. Cl. .......................... 260/569, 71/78, 71/88, 71/94, 71/103, 71/105, 71/107, 71/115, 71/118, 71/121, 260/239 B, 260/247, 260/247.1, 260/247.2 A, 260/247.2 B, 260/268 N, 260/293.72, 260/293.73, 260/293.74, 260/293.75, 260/293.77, 260/293.81, 260/465 E, 260/471 R, 260/471 C, 260/515 A, 260/518 R, 260/518 A, 260/556 A, 260/558 H, 260/577, 260/607 A

[51] Int. Cl. .......................................... C07c 109/04

[58] Field of Search ........................ 260/569; 71/121

[56] References Cited

UNITED STATES PATENTS 3,383,409 5/1968 Bream et al. .................. 260/569 X

*Primary Examiner*—Robert V. Hines
*Attorney, Agent, or Firm*—Harry Falber; Philip P. Berestecki

[57] ABSTRACT

2-Nitrophenylhydrazines of the formula (I)

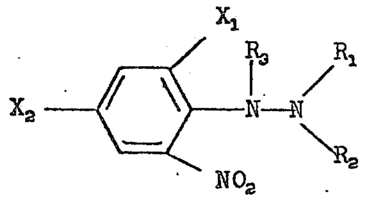

wherein $X_1$ represents nitro, halogeno or trifluoromethyl, $X_2$ represents hydrogen halogen, trifluoromethyl, lower alkyl, carbamyl, lower alkylsulfonyl, lower alkylsulfonamido, lower alkyl carbamyl, lower alkylcarbazyl, carboxyl, lower alkoxycarbonyl, nitro, or cyano, each of $R_1$ and $R_2$ is lower alkyl or lower alkoxy-lower alkyl, or $R_1$ and $R_2$ taken together with the nitrogen atom to which they are linked, represent piperidino, hexamethylenimino, morpholino, or 4-methylpiperazino, and $R_3$ represents hydrogen or lower alkyl, with the proviso that no more than one of $X_1$ and $X_2$ may represent nitro, are herbicidally active compounds. They are toxic to a wide variety of weed species but, at the same time, are not harmful to desirable plant growth. A method for controlling undesirable plants using these compounds and compositions containing these compounds as active ingredients are also disclosed herein.

8 Claims, No Drawings

2-NITROPHENYLHYDRAZINES

RELATED APPLICATION

This application is a continuation in part of co-pending application Ser. No. 102,993, filed Dec. 30, 1970 and now abandoned.

DESCRIPTION OF THE INVENTION

The present invention concerns herbicidal 2-nitrophenylhydrazines, processes for the production thereof, methods for controlling undesirable plant growth with the aid of these 2-nitrophenylhydrazines, and compositions containing said 2-nitrophenylhydrazines as herbicidally active substances. The herbicidally active 2-nitrophenylhydrazines of the present invention are particularly useful for the control of tobacco suckers.

More particularly, the invention concerns 2-nitrophenylhydrazines of the general formula (I)

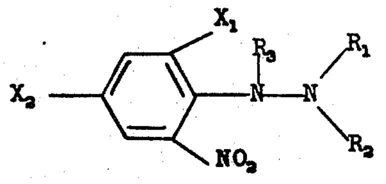

wherein $X_1$ represents nitro, halogeno or trifluoromethyl, $X_2$ represents hydrogen halogen, trifluoromethyl, lower alkyl, carbamyl, lower alkylsulfonyl, lower alkyl sulfonamido, lower alkyl carbamyl, lower alkylcarbazyl, carboxyl, lower alkoxycarbonyl, nitro, or cyano, each of $R_1$ and $R_2$ is lower alkyl or lower alkoxy-lower alkyl, or $R_1$ and $R_2$ taken together with the nitrogen atom to which they are linked, represent piperidino, hexamethylenimino, morpholino, or 4-methylpiperazino, and $R_3$ represents hydrogen or lower alkyl, with the proviso that no more than one of $X_1$ and $X_2$ may represent nitro.

In the foregoing definition, the word "lower" as used in the terms "lower alkyl" and "lower alkoxy" indicates sautrated aliphatic hydrocarbon radicals having no more than four carbon atoms. Included within the definition, therefore, are methyl, ethyl, isopropyl, n-butyl, etc., as well as their oxygen-containing analogues. Halogen-containing substituents are those in which the halogen atoms may be fluorine, chlorine, or bromine.

Especially useful are those compounds included within formula (I) which have the structure (II)

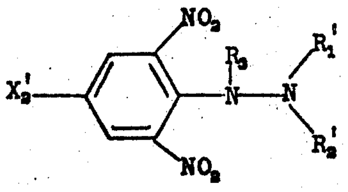

wherein $X_2'$ represents trifluoromethyl chloro, lower alkyl, lower alkylsulfonyl, or cyano, each of $R_1'$ and $R_2'$ represents lower alkyl, and $R_3$ is defined as in formula (I).

Particularly useful compounds falling within the structure of formula (II) are those in which $X_2'$ is trifluoromethyl and $R_3$ is hydrogen.

The following compounds are exceptionally useful in the control of tobacco suckers: 2-(4-chloro-2,6-dinitrophenyl)-1,1,-diethylhydrazine, 2-(2,6-dinitro-4-trifluoromethyl)-1,1-diethylhydrazine, 2-(2-trifluoromethyl,4,6-dinitrophenyl)-1,1-diethylhydrazine, 2-(2,6-dinitro-p-tolyl)-1,1-diethylhydrazine, 2-(4-chloro-2,6-dinitrophenyl)-1,1-dimethylhydrazine, and 2-(2,6-dinitro-4-trifluoromethylphenyl)-1,1-dimethylhydrazine.

The herbicidal compounds of the present invention can of course be formulated and applied in accordance with a wide variety of conventional agronomic techniques. Conveniently herbicidal formulations are prepared containing about 2 – 90 percent by weight active ingredients and are applied at a rate of about 0.5 –30 lbs. per acre. When the compounds of the present invention are used for tobacco sucker control they are preferably applied at a rate of about 10 to about 400 milligrams per plant.

Compounds of formula (I) may be prepared by reacting substantially equimolar amounts of a 2-nitro-1-chlorobenzene of formula (III)

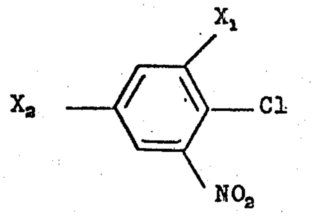

(III)

with a hydrazine of formula (IV)

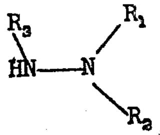

(IV)

in the presence of an acid acceptor such as an alkylamine of formula (V)

$$Y_3N \qquad (V)$$

In these structures, $X_1$, $X_2$, $R_1$, $R_2$, and $R_3$ have the meanings ascribed to them in formula (I), and Y represents lower alkyl. These reactants are dissolved in a suitable aprotic solvent, such as tetrahydrofuran, a dioxane, or low molecular weight ethers. A precipitate of trialkylamine hydrochloride appears and is filtered off. The solvent is then evaporated to yield the 2-nitrophenylhydrazine of formula (I).

The starting materials are readily available or can be prepared by methods well-known in the art. Thus, compounds of formula (III) may be prepared by nitration of an appropriate chlorobenzene or replacement of the —OH group of a nitrophenol by a chlorine atom. Details concerning the preparation of a nitrophenol by a chlorine atom. Details concerning the preparation of representative examples of those compounds may be found in Bunnet et al., *J.A.C.S.* 76, 3936–39 (1954), Friedrich et al., U.S. Pat. No. 2,257,093 (Sept. 30, 1944); and Soper U.S. Pat. No. 3,442,639 (May 6, 1969).

The hydrazines of formula (IV) are either commercially available or may be prepared by amination of dialkylamines with chloramine or hydroxylamine-O-sulfonic acid or catalyzed ammonia or by reduction of dialkylnitrosamines.

The trialkylamine of formula (V) functions as an acid acceptor. In lieu thereof, other compounds which will form an insoluble salt in the reaction may be used. These compounds include pyridines and alkylpyridines, alkali metal hydroxides, excess substituted hydrazine, or other acid acceptors well-known in the art. It is advantageous to use excess hydrazine as the acid acceptor, since the resulting hydrazine hydrochloride may be treated with an inorganic base, thus recovering the substituted hydrazine.

The 2-nitrophenylhydrazines of formula I, mixed together with the usual additives, are used as herbicidal agents. Furthermore, the active substances can be mixed with fertilizers and applied in this form. The range of activity of the compounds of the invention can be widened by applying them in admixture with other herbicides, e.g., with triazines such as halogendiamino-s-triazines, alkoxy- and alkylthiodiamino-s-triazines, diazines such as uracils, pyridazines, phenols, aliphatic carboxylic acids and halogen carboxylic acids, halogenated benzoic acids and halogenated phenylacetic acids, aryloxyalkane carboxylic acids and aryloxyalkane sulfonic acids, pyridine carboxylic acids, amides, thioamides, hydrazides, esters and nitriles of similar carboxylic acids, carbamic acid esters and thiocarbamic acid esters, quaternary ammonium compounds, ureas, inorganic salts, etc., especially with:

2-chloro-4,6-bis-(ethylamino)-s-triazine
2-chloro-4-ethylamino-6-isopropylamino-s-triazine
2-chloro-4,6-bis-(methoxypropylamino)-s-triazine
2-methoxy-4,6-bis-(isopropylamino)-s-triazine
2-methylthio-4-methoxypropylamino-isopropylamino-s-triazine
2-methylthio-4,6-bis-(isopropylamino)-s-triazine
2-methylthio-4,6-bis-ethylamino)-s-triazine
2-methylthio-4-ethylamino-6-isopropylamine-s-triazine
2-methoxy-4,6-bis-(ethylamino)-s-triazine
2-methoxy-4-ethylamino-6-isopropylamino-s-triazine
2-chloro-4,6-bis-(isopropylamino)-s-triazine
5-bromo-3-sec.butyl-6-methyl-uracil
3-cyclohexyl-5,6-trimethylene-uracil
5-amino-5-chloro-1-phenyl-pyridazone-(6)
3,6-dioxo-1,2,3,6-tetrahydropyridazine
dinitro-sec.butylphenol and salts thereof
pentachlorophenol and salts thereof
trichloroacetic acid and salts thereof
2,2-dichloropropionic acid and salts thereof
2-chloro-N,N-diallylacetic acid amide
N-(3',4'-dichlorophenyl)-cyclopropane carboxylic acid amide
maleic acid hydrazide
2,3,6-trichlorobenzoic acid and salts thereof
2,3,5,6-tetrachlorobenzoic acid and salts thereof
2-methoxy-3,5,6-trichlorobenzoic acid and salts thereof
2-methoxy-3,6-dichlorobenzoic acid and salts thereof
3-amino-2,5-dichlorobenzoic acid and salts thereof
3-nitro-2,5-dichlorobenzoic acid and salts thereof
2-methyl-3,5-dichlorobenzoic acid and salts thereof
2-methyl-3,5-dichlorobenzoic acid and salts thereof
2,6-dichlorobenzonitrile
2,6-dichloro-thiobenzamide
2,3,6-trichlorophenyl acetic acid and salts thereof
2,4-dichlorophenoxyacetic acid and salts thereof
2,4,5-trichlorophenoxyacetic acid and salts and esters thereof
(2-methyl-4-chlorophenoxy)-acetic acid and salts and esters thereof
2-(2',4',5'-trichlorophenoxy)-propionic acid and salts and esters thereof
2-(2',4',5'-trichlorophenoxy)-ethyl-2,2-dichloropropionate
4-(2',4'-dichlorophenoxy)-butyric acid and salts and esters thereof
4-(2'-methyl-4'-chlorophenoxy)-butyric acid and salts and esters thereof
2,3,6-trichlorobenzyloxypropanol
4-amino-3,5,6-trichloropicolinic acid
N'-cyclooctyl-N,N-dimethyl urea
3-phenyl-1,1-dimethyl urea
3-(4'-chlorophenyl)-1,1-dimethyl urea
3-(3'-trifluoromethylphenyl)-1,1-dimethyl urea
3-(3',4'-dichlorophenyl)-1,1-dimethyl urea
3-(3',4'-dichlorophenyl)-1-n-butyl-1-methyl urea
3-(3',4'-dichlorophenyl)-1,1,3-trimethyl urea
3-(3',4'-dichlorophenyl)-1,1-diethyl urea
3-(4'-chlorophenyl)-1-methoxy-1-methyl urea
3-(3',4'-dichlorophenyl)-1-methoxy-1-methyl urea
3-(4'-bromophenyl)-methoxy-1-methyl urea
3-(3',4'-dichlorophenyl)-3-methoxy-1,1-dimethyl urea
3-(4'-chlorophenoxyphenyl)-1,1-dimethyl urea
N,N-di-(n-propyl)-S-ethyl-thiolcarbmaic acid ester
N,N-di-(n-propyl)-S-n-propyl-thiolcarbamic acid ester
N-ethyl-N-(n-butyl)-S-thiolcarbamic acid ester
N-phenyl-O-isopropyl-carbamic acid ester
N-(m-chlorophenyl)-O-isopropyl-carbamic acid ester
N-(m-chlorophenyl)-O-(4'-chloro-2'-butinyl)-carbamic acid ester
N-(3',4'-dichlorophenyl)-O-methyl-carbamic acid ester.

The following examples are intended to illustrate some of the embodiments of the present invention. The examples therefore are for illustrative purposes only and are not to be construed as limitations.

EXAMPLE 1

Equimolar amounts of 4-chloro-3,5-dinitrobenzotrifluoride, 1,1-diethylhydrazine, and triethylamine were dissolved in tetrahydrofuran in that order. A precipitate of triethylamine hydrochloride appeared. After a few days, the precipitate filtered off and the solvent evaporated to yield crude 2-(2',6'-dinitro-4'-trifluoromethylphenyl)-1,1-diethylhydrazine, m.p. 68°–75°C. Recrystallization from hexane gives m.p. 82°–84°C.

| | |
|---|---|
| Analysis - | $C_{11}H_{13}F_3N_4O_4$: |
| Calc. | C, 40.99%; H, 4.07%; N, 17.39%. |
| Found | C, 40.78%; H, 4.08%; N, 17.37%. |

EXAMPLE 2

Six grams of 4-chlorophenylmethylsulfone plus 3.3 grams potassium nitrate were dissolved in 50 ml 30 percent fuming sulfuric acid, heated to 90°C, then cooled. More potassium nitrate (6.6 grams) was then added, and the mixture heated to 120°–140°C for five hours, cooled, and poured over ice. Seven grams of crude 4-chloro-3,5-dinitrophenylmethylsulfone, m.p. 190°–200°C, were recovered. The latter is reacted with 1,1-diethylhydrazine and triethylamine as in Example 1 to give crude 2-(2',6'-dinitro-4'-methylsulfonylphenyl)-1,1-diethylhydrazine, m.p. 139°–144°C. Recrystallization from tetrahydrofuran and ligroine gives m.p. 153.5° – 154.5°C.

| | |
|---|---|
| Analysis - | $C_{11}H_{16}N_4O_6S$ |
| Calc. | C, 39.75; H, 4.85; N, 16.86. |
| Found | C, 39.84; H, 5.04; N, 16.74. |

EXAMPLES 3 - 36

The methods of Example 1 were used, employing the proper reactants, to prepare a number of 2-nitrophenyl-hydrazine compounds according to formula (1). These compounds, together with their crude melting points, appear in the following table:

TABLE 1

| Ex. | Compound | m.p. |
|---|---|---|
| 3 | 2-(2',6'-dinitro-4'-trifluoromethylphenyl)-1,1-dimethylhydrazine<br>Analysis— $C_9H_9F_3N_4O_4$<br>Calc. C, 36.74; N, 19.05<br>Found C, 36.89; N, 19.15 | 106–107°C (Hexane) |
| 4 | 2-(2',6'-dinitro-4'-trifluoromethylphenyl)-1,1,2-trimethylhydrazine<br>Analysis— $C_{10}H_{11}F_3N_4O_4$<br>Calc. C, 38.97; N, 18.18<br>Found C, 39.11; N, 18.02 | 89–92°C |
| 5 | 2-(2',6'-dinitro-4'-trifluoromethylphenyl)-1,1-dimethyl-2-n-propylhydrazine | red oil |
| 6 | 2-(2',6'-dinitro-4'-trifluoromethylphenyl)-1,1-dimethyl-2-isopropylhydrazine | red oil |
| 7 | 2-(2',6'-dinitro-4'-trifluoromethylphenyl)-1,1-dimethyl-2-cyclopentylhydrazine | red oil |
| 8 | 2-(2',6'dinitro-4'-trifluoromethylphenyl)-1,1-di-n-butylhyrazine | red oil |
| 9 | 2-(2',6'-dinitro-4'-trifluromethylphenyl)-1,1-di-n-propylhydrazine | red oil |
| 10 | 2-(2',6'-dinitro-4'-trifluoromethylphenyl)-1,1-diisopropylhydrazine | red oil |
| 11 | 2-(2',6'-dinitro-4'-trifluoromethylphenyl)-1-n-butyl-1-ethylhydrazine | 42–45°C |
| 12 | 1-(2',6'-dinitro-4'-trifluoromethylanilino)-hexamethylenimine<br>Analysis— $C_{13}H_{15}F_3N_4O_4$<br>Calc. C, 44.83; N, 16.09<br>Found C, 45.16; N, 16.10 | 138–139°C |
| 13 | 1-(2',6'-dinitro-4'-trifluoromethylanilino)-piperidine<br>Analysis— $C_{12}H_{13}F_3N_3O_4$<br>Calc. C, 43.12; H, 3.92; N, 16.76<br>Found C, 43.11; H, 3.92; N, 16.73 | 142–143°C |
| 14 | 4-(2',6'-dinitro-4'-trifluoromethylanilino)-morpholine<br>Analysis— $C_{11}H_{11}F_3N_4O_5$<br>Calc. C, 39.29; H, 3.30; N, 16.66<br>Found C, 39.26; H, 3.31; N, 16.62 | 155–156°C |
| 15 | 2-(2',6'-dinitro-p-tolyl)-1,1-diethylhydrazine<br>Analysis— $C_{11}H_{16}N_4O_4$<br>Calc. C, 49.25; H, 6.01; N, 20.89 | 79–81°C |

TABLE 1-Continued

| Ex. | Compound | m.p. |
|---|---|---|
| | Found C, 49.21; H, 5.97; N, 20.71 | |
| 16 | 2-(2',6'-dinitro-4'-cyanophenyl)-1,1-diethylhydrazine<br>Analysis— $C_{11}H_{13}N_5O_4$<br>Calc. C, 47.31; N, 25.08<br>Found C, 47.19; N, 25.14 | 88–90°C |
| 17 | 2-(2'-chloro-4',6'-dinitrophenyl)-1,1-diethylhydrazine<br>Analysis— $C_{10}H_{13}N_4O_4$<br>Calc. C, 41.61; H, 4.54; N, 19.41<br>Found C, 41.79; H, 4.58; N, 19.34 | 80–81°C |
| 18 | 2-(2'-trifluoromethyl-4',6'-dinitrophenyl)-1,1-diethylhydrazine | red oil |
| 19 | 2-(4'-chloro-2',6'-dinitrophenyl)-1,1-diethylhydrazine<br>Analysis— $C_{10}H_{13}ClN_4O_4$<br>Calc. C, 41.61; H, 4.54; N, 19.41<br>Found C, 41.73; H, 4.55; N, 19.27 | 51–52°C |
| 20 | 2-(4'-methoxycarbonyl-2',6'-dinitrophenyl)-1,1-diethylhydrazine<br>Analysis— $C_{12}H_{16}N_4O_6$<br>Calc. C, 46.15; N, 17.94<br>Found C, 46.52; N, 17.92 | 96–98°C |
| 21 | 2-(4'-dimethylcarbamyl-2',6'-dinitrophenyl)-1,1-diethylhydrazine<br>Analysis— $C_{13}H_{19}N_5O_5$<br>Calc. C, 47.99; N, 21.53<br>Found C, 48.19; N, 21.67 | 134–136°C |
| 22 | 2-(4'-(dimethylaminosulfonyl)-2',6'-dinitrophenyl)-1,1-diethylhydrazine | |
| 23 | 2-(4'-(trimethylhydrazinosulfonyl)-2',6'dinitrophenyl)-1,1-diethylhydrazine | |
| 24 | 2-(4'-(2,2-dimethylhydrazinosulfonyl)-2',6'-dinitrophenyl)-1,1-diethylhydrazine | |
| 25 | 2-(4'-(aminosulfonyl)-2',6'-dinitrophenyl)-1,1-diethylhydrazine | |
| 26 | 2-(4'-(N,N-dimethylcarbazyl)-2',6'-dinitrophenyl)-1,1-diethylhydrazine | |
| 27 | 2-(4'-(N,N,N'-trimethylcarbazyl)-2',6'-dinitrophenyl)-1,1-diethylhydrazine<br>Analysis— $C_{14}H_{22}N_6O_5$<br>Calc. C, 47.45; N, 23.72<br>Found C, 47.60; N, 23.73 | 133–135°C |
| 28 | 2-(4'-(N,N-dimethylcarbazyl)-2',6'-dinitrophenyl)-1,1-dimethylhydrazine | 172–186°C |
| 29 | 2-(4'-carbamyl-2',6'-dinitrophenyl)-1,1-diethylhydrazine | 145–149°C |
| 30 | 2-(4'-carbazyl-2',6'-dinitrophenyl)-1,1-diethylhydrazine | |
| 31 | 2-(4'-(2,2-diethylcarbazyl)-2',6'-dinitrophenyl)-1,1-diethylhydrazine | red oil |
| 32 | 2-(4'-(N-methoxy-N-methylcarbamyl)-2',6'-dinitrophenyl)-1,1-diethylhydrazine<br>Analysis— $C_{13}H_{19}N_5O_6$<br>Calc. C, 45.74; N, 20.52<br>Found C, 45.73; N, 20.40 | 118–120°C |
| 33 | 2-(4'(2,2-dimethylhydrazinosulfonyl-2',6'-dinitrophenyl-1,1-dimethylhydrazine | 125°C |
| 34 | 2-(4'-(2,2-diethylhydrazinosulfonyl)2',6'-dinitrophenyl)-1,1-diethylhydrazine | 110°C |
| 35 | 2-(4'-chloro-2,6-dinitrophenyl)-1,1-dimethylhydrazine<br>Analysis— $C_8C_9ClN_4O_4$<br>Calc. C, 36.86; N, 21.50<br>Found C, 36.88; N, 21.58 | 89–91°C |
| 36 | 2-(2',6'-dinitrophenyl)-1,1-diethylhydrazine<br>Analysis— $C_{10}H_{14}N_4O_4$<br>Calc. C, 47.24; H, 5.51; N, 22.04<br>Found C, 47.37; H, 5.51; N, 22.00 | 69–70°C |

EXAMPLE 37

Various 2-nitrophenylhydrazine derivatives prepared according to the foregoing examples were finely ground in potassium bromide, suspended in 0.1% aqueous Igepal CO-890 non-ionic surfactant and applied at a rate of 10 lbs. per acre to various weed and crop species. The seeds were pushed into the soil surface and left exposed until soon after application of the 2-nitrophenylhydrazines, at which time they were covered with a thin layer of soil. The tests were conducted in a greenhouse in which the light was enhanced by 400 watt mercury arc lamps equipped with large reflectors suspended three feet above the soil on 4-foot centres. The lamps were turned on for a 2-hour period each day. Eight days after treatment, the stand and vigor (i.e., proportionate plant size) as a percent of the untreated control were recorded and tabulated. The results are set forth in Table II, where the data are compared with untreated and carrier controls and with trifluraline (N,N-di-n-propyl-4-trifluoromethyl-2,6-dinitroaniline), a well-known herbicide.

carrier control was prepared in the same way. These compositions were applied at the rate of 5 lbs. of active ingredient per acre to various crop and weed species. The seeds were pushed into the soil surface and the surface was treated with the aforementioned compositions. Eighteen hours after treatment, the seeds were covered with a thin layer of soil. These tests took place in a greenhouse with the enhanced lighting described in Example 16. Ten days after treatment, the stand and vigor as a percent of the untreated control were observed. The data are set forth below in Table III.

TABLE II

| Compound of Example No. | | Ryegrass *Lolium multiforum* | Coker 67 Corn *Zea mays* | Annual Bluegrass *Poa Annua* | Rutgers Tomato *Lycopersicum esculentum* |
|---|---|---|---|---|---|
| 3 | stand % | 0 | 100 | 0 | 100 |
| | vigor % | 0 | 70 | 0 | 50 |
| 4 | stand % | 0 | 70 | 0 | 100 |
| | vigor % | 0 | 70 | 0 | 80 |
| 5 | stand % | 80 | 100 | 100 | 100 |
| | vigor % | 60 | 100 | 20 | 100 |
| trifluralin | stand % | 0 | 90 | 100 | 100 |
| | vigor % | 0 | 20 | 50 | 50 |
| Carrier Control | stand % | 100 | 100 | 100 | 100 |
| | vigor % | 100 | 100 | 100 | 100 |
| Check (untreated) | stand % | 100 | 100 | 100 | 100 |
| | vigor % | 100 | 100 | 100 | 100 |

TABLE III

| Compound of Example No. | | Rye grass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 1 | stand % | 0 | 80 | 100 | 80 | 80 |
| | vigor % | 0 | 5 | 60 | 10 | 20 |
| trifluralin | stand % | 0 | 100 | 100 | 50 | 80 |
| | vigor % | 0 | 10 | 20 | 30 | 20 |
| Carrier Control | stand % | 100 | 100 | 100 | 100 | 100 |
| | vigor % | 100 | 100 | 100 | 100 | 100 |
| Check (untreated) | stand % | 100 | 100 | 100 | 100 | 100 |
| | vigor % | 100 | 100 | 100 | 100 | 100 |

EXAMPLE 38

2-(2',6'-Dinitro-4'-trifluoromethylphenyl)-1,1-diethylhydrazine, prepared according to the method of Example 1, was dissolved in one volume of triethanolamine, which solution was then dissolved in 10 volumes of methanol. The resulting solution was dissolved in 40 volumes of 0.1 percent aqueous Igepal CO-890, and thoroughly blended. A solution of trifluralin and of the

EXAMPLE 39

Compositions containing various compounds of this invention were prepared according to the method disclosed in Example 38. They were applied to various species of crops and weeds according to the method of Example 38 except that the application rate was 1 lb. per acre. Nine days after treatment, the stand and vigor as a percent of the untreated control were observed. The data are recorded in Table IV.

TABLE IV

| Compound of Example No. | | Ryegrass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 1 | stand % | 0 | 100 | 100 | 100 | 100 |
| | vigor % | 0 | 5 | 100 | 50 | 20 |
| 9 | stand % | 0 | 100 | 100 | 100 | 100 |
| | vigor % | 6 | 60 | 90 | 60 | 70 |
| 10 | stand % | 40 | 100 | 100 | 40 | 100 |
| | vigor % | 70 | 100 | 90 | 70 | 70 |
| 11 | stand % | 5 | 100 | 100 | 40 | 100 |
| | vigor % | 40 | 80 | 90 | 60 | 70 |
| Trifluralin | stand % | 0 | 100 | 100 | 50 | 30 |
| | vigor % | 0 | 20 | 40 | 30 | 10 |
| Carrier Control | stand % | 100 | 100 | 100 | 100 | 100 |
| | vigor % | 100 | 100 | 100 | 100 | 100 |
| Check (untreated) | stand % | 100 | 100 | 100 | 100 | 100 |
| | vigor % | 100 | 100 | 100 | 100 | 100 |

EXAMPLE 40

Compositions containing various compounds of this invention were prepared according to methods set forth in Example 38. They were applied to various crop and weed species in the same manner as in Example 38 except that application rates were 5 lbs. of active ingredient per acre. Observations of stand and vigor were made 10 days after treatment. The data obtained are recorded in Table V.

TABLE V

| Compound of Example No. | | Ryegrass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 3 | stand % | 5 | 100 | 100 | 0 | 40 |
| | vigor % | 30 | 80 | 80 | 0 | 40 |
| 13 | stand % | 30 | 100 | 100 | 40 | 100 |
| | vigor % | 60 | 100 | 80 | 60 | 70 |
| 14 | stand % | 50 | 100 | 100 | 70 | 100 |
| | vigor % | 80 | 100 | 100 | 70 | 80 |
| 10 | stand % | 0 | 100 | 100 | 10 | 50 |
| | vigor % | 0 | 10 | 10 | 20 | 5 |
| 11 | stand % | 0 | 80 | 100 | 20 | 100 |
| | vigor % | 0 | 70 | 90 | 20 | 70 |
| Trifluralin | stand % | 0 | 100 | 100 | 100 | 100 |
| | vigor % | 0 | 10 | 20 | 30 | 10 |
| Carrier Control | stand % | 100 | 100 | 100 | 100 | 100 |
| | vigor % | 100 | 100 | 100 | 100 | 100 |
| Check (untreated) | stand % | 100 | 100 | 100 | 100 | 100 |
| | vigor % | 100 | 100 | 100 | 100 | 100 |

EXAMPLE 41

Various 2-nitrophenylhydrazine derivatives were finely ground with potassium chloride, suspended in a 0.1 percent aqueous Igepal CO-890 non-ionic surfactant. The seeds were pushed into the soil surface and the herbicidal compositions were applied at a rate of 2 lbs. of active ingredient per acre. These tests took place in a greenhouse with the enhanced lighting described in Example 37. Ten days after treatment, the stand and vigor as a percent of the untreated control were recorded and tabulated. At the same time, parallel tests under the same conditions and with the same active ingredient concentrations were run for trifluralin and atrazine (2-chloro-4-ethylamino-6-isopropyl-amino-s-triazine). The data obtained are reported below in Table VI.

EXAMPLE 42

An experiment was performed as in Example 37, except that the compounds were applied at 2 lb. per acre and ratings were made in ten days. The data obtained are reported in Table VII.

EXAMPLE 43

An experiment was performed as in Example 42. The data obtained are reported in Table VIII.

EXAMPLE 44

An experiment was performed as in Example 37 except the compounds were applied in an aqueous solution containing 25 percent methanol and 0.1 percent Igepal CO-890 non-ionic surfactant. Ratings made ten days later appear in Table IX.

EXAMPLE 45

An experiment was performed as in Example 44, except that ratings were made in four days. The data obtained are reported in Table X.

TABLE VI

| Compound of Example No. | | Ryegrass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 3 | stand % | 5 | 100 | 100 | 100 | 50 |
| | vigor % | 10 | 80 | 100 | 60 | 20 |
| 1 | stand % | 0 | 100 | 100 | 30 | 20 |
| | vigor % | 0 | 20 | 100 | 5 | 5 |
| 16 | stand % | 20 | 100 | 100 | 100 | 100 |
| | vigor % | 80 | 90 | 100 | 80 | 80 |
| 2 | stand % | 10 | 100 | 100 | 40 | 80 |
| | vigor % | 25 | 100 | 100 | 10 | 30 |
| Trifluralin | stand % | 0 | 100 | 100 | 25 | 75 |
| | vigor % | 0 | 5 | 10 | 5 | 5 |
| Atrazine | stand % | 5 | 100 | 80 | 5 | 10 |
| | vigor % | 10 | 100 | 10 | 5 | 5 |
| Carrier Control | stand % | 100 | 100 | 100 | 100 | 100 |
| | vigor % | 100 | 100 | 100 | 100 | 100 |
| Check (untreated) | stand % | 100 | 100 | 100 | 100 | 100 |
| | vigor % | 100 | 100 | 100 | 100 | 100 |

TABLE VII

| Compound of Example No. | | Ryegrass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 20 | stand % | 100 | 100 | 100 | 100 | 100 |
| | vigor % | 80 | 90 | 100 | 80 | 90 |
| 28 | stand % | 100 | 100 | 100 | 100 | 100 |
| | vigor % | 90 | 90 | 90 | 100 | 90 |
| 31 | stand % | 10 | 100 | 100 | 100 | 70 |
| | vigor % | 80 | 90 | 90 | 100 | 70 |
| 21 | stand % | 80 | 100 | 100 | 100 | 80 |
| | vigor % | 80 | 80 | 90 | 100 | 70 |
| 26 | stand % | 100 | 100 | 100 | 100 | 80 |
| | vigor % | 100 | 80 | 80 | 90 | 70 |
| trifluralin | stand % | 0 | 100 | 100 | 100 | 100 |
| | vigor % | 0 | 20 | 80 | 40 | 60 |
| Carrier | stand % | 100 | 100 | 100 | 100 | 100 |
| Control | vigor % | 100 | 100 | 100 | 100 | 100 |
| Check | stand % | 100 | 100 | 100 | 100 | 100 |
| (untreated) | vigor % | 100 | 100 | 100 | 100 | 100 |

TABLE VIII

| Compound of Example No. | | Ryegrass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 27 | stand % | 100 | 100 | 100 | 100 | 100 |
| | vigor % | 90 | 100 | 80 | 100 | 90 |
| 29 | stand % | 100 | 100 | 100 | 100 | 100 |
| | vigor % | 100 | 90 | 100 | 100 | 100 |
| 32 | stand % | 100 | 100 | 100 | 100 | 100 |
| | vigor % | 100 | 100 | 80 | 100 | 100 |
| Carrier | stand % | 100 | 100 | 100 | 100 | 100 |
| Control | vigor % | 100 | 100 | 100 | 100 | 100 |
| Check | stand % | 100 | 100 | 100 | 100 | 100 |
| (untreated) | vigor % | 100 | 100 | 100 | 100 | 100 |
| | stand % | 0 | 100 | 100 | 100 | 100 |
| Trifluralin | vigor % | 0 | 80 | 80 | 90 | 60 |

TABLE IX

| Compound of Example No. | | Ryegrass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 18 | stand % | 30 | 100 | 80 | 100 | 80 |
| | vigor % | 30 | 40 | 60 | 80 | 50 |
| Trifluralin | stand % | 0 | 100 | 100 | 100 | 100 |
| | vigor % | 0 | 10 | 50 | 50 | 50 |
| Carrier | stand % | 100 | 100 | 100 | 100 | 100 |
| Control | vigor % | 100 | 100 | 100 | 100 | 100 |
| Check | stand % | 100 | 100 | 100 | 100 | 100 |
| (untreated) | vigor % | 100 | 100 | 100 | 100 | 100 |

TABLE X

| Compound of Example No. | | Ryegrass *Lolium multiforum* | Coker 67 Corn *Zea mays* | Giant Grey Stripe Sunflower *Helianthus annuus* | Rutgers Tomato *Lycopersicon esculentum* | Florida Broad Leaf Mustard *Brassica juncea* |
|---|---|---|---|---|---|---|
| 33 | stand % | 100 | 100 | 100 | 100 | 100 |
| | vigor % | 70 | 70 | 100 | 100 | 100 |
| 34 | stand % | 100 | 100 | 100 | 100 | 100 |
| | vigor % | 70 | 70 | 100 | 100 | 100 |
| Trifluralin | stand % | 0 | 100 | 100 | 100 | 100 |
| | vigor % | 0 | 20 | 80 | 100 | 80 |
| Carrier | stand % | 100 | 100 | 100 | 100 | 100 |
| Control | vigor % | 100 | 100 | 100 | 100 | 100 |
| Check | stand % | 100 | 100 | 100 | 100 | 100 |
| (untreated) | vigor % | 100 | 100 | 100 | 100 | 100 |

EXAMPLE 46

Plots of six Hicks broadleaf tobacco plants on which suckers (i.e., axillary branch buds) were beginning to appear were treated with 20 ml. of 25 percent acetone in water containing 400, 1,400, or 4,000 parts of 2-(4-chloro-2,6-dinitrophenyl)-1,1-diethylhydrazine per million over the tops of the plants. Two weeks after treatment, the percentage of suckers as counted were as follows:

| Untreated Check | 400 ppm | 1400 ppm | 4000 ppm |
|---|---|---|---|
| 100% | 80% | 17% | 3% |

EXAMPLE 47

An experiment was performed, as in Example 46, except that 30 ml. of 50 percent acetone in water containing 267, 911, or 2,670 parts of 2-(2,6-dinitro-4-trifluoromethyl)-1,1-diethylhydrazine was applied Percentages of suckers were as follows:

| Untreated Check | 267 ppm | 911 ppm | 2670 ppm |
|---|---|---|---|
| 100% | 90% | 70% | 30% |

EXAMPLE 48

An experiment was performed, as in Example 47, except that 2-(2-chloro-4,6-dinitrophenyl)-1,1-diethylhydrazine was the solute. Percentage of suckers were:

| Untreated Check | 267 ppm | 911 ppm | 2670 ppm |
|---|---|---|---|
| 100% | 100% | 80% | 40% |

EXAMPLE 49

An experiment was performed in the manner of Example 46, except that A-820 (the known herbicide and tobacco sucker agent 4-t-butyl-2,6-dinitro-N-sec-butylaniline) and the compound of Example 19 were each applied to 8 plants to 2667 ppm. Suckers were counted 28 days later:

| | No. Suckers/8 plants |
|---|---|
| check | 44 |
| A-820 | 2 |
| Example 19 | 1 |

EXAMPLE 50

An experiment was conducted as described in Example 49, except the compounds of Examples 1 and 17 were tested:

| | No. suckers/8 plants |
|---|---|
| carrier control | 50 |
| Example 17 | 22 |
| Example 1 | 6 |

The compounds of the present invention are especially desirable for controlling tobacco suckers in that the treatment does not damage the tobacco and obviates much hand labor. They are also advantageous because they are unusually soluble in organic solvents.

The production of herbicidal compositions according to the invention is carried out in a manner well-known in the art by the intimate mixing and grinding of the active substances of the general formula I with suitable carriers, optionally with the addition of dispersing agents or solvents which are inert to the active substances. The active substances can exist and be used in the following forms:

as solids: dusts, sprinkling agents, granulates, coated granules, impregnated granules and homogeneous granules;

as concentrates of active substances dispersible in water: wettable powder, pastes, emulsions;

as liquids: solutions, aerosols.

To produce the solid forms (dusts, sprinkling agents, granulates), the active substances are mixed with solid carriers. Suitable carriers are, e.g., kaolin, talcum, bole, chalk, limestone, ground limestone, dolomite, diatomaceous earth, precipitated silicic acid, alkaline earth silicates, sodium and potassium aluminum silicates (feldspar and mica), calcium and magnesium sulfates, magnesium oxide, ground synthetic plastics, fertilizers such as ammonium sulfate, ammonium phosphate, ammonium nitrate, ureas, ground vegetable products such as grain flour, bark flour, sawdust, ground nut shells, cellulose powder, residues of plant extractions, activated charcoal, etc.. These carriers can be used separately or they can be mixed with each other.

The grain size of the carriers is, for dusts, advantageously up to ca. 0.1 mm, for sprinkling agents it is ca. 0.075 to 0.2 mm and for granulates 0.2 mm upwards.

The concentrations of active substances in the solid preparations are, as a rule, 0.5 to 80 percent of the total weight.

To these mixtures can also be added additives which stabilize the active substance and/or non-ionic, anion-active and cation-active substances, which, for example, improve the adhesion of the active substances on plants and parts of plants (glues and adhesives) and/or ensure a better wettability (wetting agents) and also dispersibility (dispersing agents). The following are examples of adhesives: olein-chalk mixtures, cellulose derivatives (methyl cellulose, carboxymethyl cellulose), hydroxyethyl glycol ethers of mono- and di-alkyl phenols having 5 to 15 ethylene oxide radicals per molecule and eight or nine carbon atoms in the alkyl radical, lignin sulfonic acids, their alkali and alkaline earth metal salts, polyethylene glycol ethers, fatty alcohol polyethylene glycol ethers having 5 to 20 ethylene oxide radicals per molecule and eight to 18 carbon atoms in the fatty alcohol part, condensation products of ethylene oxide, propylene oxide, polyvinyl pyrrolidones, polyvinyl alcohols, condensation products of urea/formaldehyde as well as Latex products.

Concentrates of active substances which can be dispersed in water (wettable powders), pastes and emulsion concentrates, are agents which can be diluted with water to given any desired concentration. They consist of active substances, carriers, optionally additives which stabilize the active substance, surface agent substances and antifoaming agents and, optionally, solvents. The concentration of active substance in these agents is 5 to 80 percent of the totall weight of the latter.

The wettable powders and pastes napthalene obtained by mixing and grinding the active substances with dispersing agents and pulverulent carriers in suitable devices until homogeneity is attained. Suitable carriers are, for example, those previously mentioned for solid preparations. It is advantageous in some cases to use mixtures of different carriers. Suitable dispersing agents are, e.g., condensation products of sulfonated naphthalene and sulfonated naphthalene derivatives with formaldehyde, condensation products of napthalene or of napthalene sulfonic acids with phenol and formaldehyde, also alkali, ammonium and alkaline earth metal salts of lignin sulfonic acid, also alkylaryl sulfonates, alkali and alkaline earth metal salts of dibutyl naphthalene sulfonic acid, fatty alcohol sulfates such as salts of sulfated fatty alcohol glycol ethers, the sodium salt of oleyl ethionate, the sodium salt of oleyl methyl tauride, ditertiary acetylene glycols, dialkyldilauryl ammonium chloride and fatty acid alkali and alkaline earth metal salts.

Examples of anti-foaming agents are: silicones, etc. The active substances are so mixed, ground, sieved and strained with the above-mentioned additives that the solid particle size in wettable powders does not exceed 0.02 – 0.04 mm and, in the case of pastes, 0.003 mm. To produce emulsion concentrates and pastes, dispersing agents such as those stated in the previous sections, organic solvents and water are used. Examples of solvents are: alcohols, benzene, xylenes, toluene, dimethyl sulfoxide and mineral oil fractions boiling between 120° and 350°C. The solvents must be practically without smell, not phytotoxic, inert to the active substances and not easily flammable.

In addition, the agents according to the invention can be used in the form of solutions. For this application, the active substance or substances of the general formula I are dissolved in suitable organic solvents, mixtures of solvents or in water. Aliphatic and aromatic hydrocarbons, chlorinated derivatives thereof, alkyl naphthalenes, mineral oils, on their own or mixed with each other, can be used as organic solvents. The solvents should contain the active substances within a concentration range of 1 to 20 percent calculated on the total weight of the resulting solution.

Other biocidal active substances or agents can be mixed with the described compositions according to the invention. Thus, in addition to the stated compounds of the general formula I and other herbicides, the new agents can also contain, e.g., insecticides, fungicides, bactericides, fungistatics, bacteriostatics or nemactocides in order to widen the range of action. The compositions according to the invention can also contain fertilizers, micronutrients, etc.

Forms of preparation of these active substances are described in the following. Where not otherwise expressly stated, the terms "parts" and "percentages" are given by weight.

Wettable Powder

The following constituents are used to produce
a. a 10 percent wettable powder, and
b. a 25 percent wettable powder:

a.
- 10 parts of 2-(2,6-dinitro-4-trifluoromethylphenyl)-1,1-dimethylhydrazine
- 10 paprts of lignin sulfonic acid calcium salt
- 2 parts of adhesive consisting of 50% polyvinylpyrrolidone and 50% Champagne chalk
- 38 parts of kaolin
- 40 parts of Champagne chalk b.
- 25 parts of 2-(2,6-dinitro-4-trifluoromethylphenyl-1,1,2-trimethyldrazine
- 5 parts of condensation products of naphthalene sulfonic acid, phenol sulfonic acids and formaldehyde in the ratio 3:2:0.5
- 4 parts of dibutyl naphthyl sulfonate sodium salt
- 1 part of methyl-oleyl-tauride sodium salt
- 15 parts of silicic acid
- 25 parts of neutral sodium aluminum silicate
- 25 parts of kaolin The stated active substances are coated onto the corresponding carriers (kaolin and chalk) and then mixed and ground with the listed additives. A wettable powder is obtained having excellent wettability and suspension properties. Suspensions of any desired active substance concentration can be prepared from this wettable powder by diluting with water.

Emulsion Concentrate

The following constituents are mixed together to produce a 25 percent emulsion concentrate:
- 25 parts of 2-(2,6-dinitro-4-γ-trifluoromethylphenyl)-1,1-diethylhydrazine
- 35 parts of methylethylketone
- 30 parts of xylol and
- 10 parts of isooctylphenyl polyethylene glycol This concentrate can be diluted with water to obtain emulsions of suitable concentrations. Such emulsions are suitable for controlling weeds in cultivated plantations, for which purpose application of amounts of about 0.5 to 4 lbs. of a compound of formula (I) per acre of treated soil is recommended.

I claim:

1. A compound of the formula

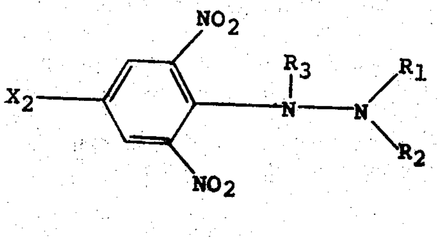

wherein $X_2$ is trifluoromethyl or halogen; each of $R_1$ and $R_2$ is lower alkyl; and $R_3$ is hydrogen or lower alkyl.

2. A compound according to claim 1 which is 2-(2′,6′-dinitro-4′-trifluoromethylphenyl)-1,1-diethylhydrazine.

3. A compound according to claim 1 which is 2-(2′,6′-dinitro-4′-trifluoromethylphenyl)-1,1-dimethylhydrazine.

4. A compound according to claim 1, which is 2-(2′,6′-dinitro-4′-trifluoromethylphenyl)-1,1-2-trimethylhydrazine.

5. A compound according to claim 1 which is 2-(2′,6′-dinitro-4′-trifluoromethylphenyl)-1,1-di-n-propylhydrazine.

6. A compound according to claim 1 which is 2-(2′,6′-dinitro-4′-trifluoromethylphenyl)-1-n-butyl-1-ethylhydrazine.

7. A compound according to claim 1 which is 2-(2′,6′-dinitro-4′-trifluoromethylphenyl)-1,1-diisopropylhydrazine.

8. A compound according to claim 1 which is 2-(2′,6′-dinitro-4′-chlorophenyl)-1,1-diethylhydrazine.

* * * * *